(12) United States Patent
Williams

(10) Patent No.: US 7,624,830 B1
(45) Date of Patent: Dec. 1, 2009

(54) ENERGY RECOVERABLE WHEEL MOTOR

(76) Inventor: Kevin Williams, P.O. Box 1359, Cypress, TX (US) 77421

( * ) Notice: Subject to any disclaimer, the term of this patent is extended or adjusted under 35 U.S.C. 154(b) by 281 days.

(21) Appl. No.: 11/478,562

(22) Filed: Jun. 30, 2006

Related U.S. Application Data

(60) Provisional application No. 60/701,155, filed on Jul. 22, 2005.

(51) Int. Cl.
  *B60K 6/00* (2007.10)
  *B60K 8/00* (2006.01)
  *B60K 1/00* (2006.01)

(52) U.S. Cl. ............ 180/165; 180/65.51; 180/65.6; 180/65.1; 310/254

(58) Field of Classification Search ......... 180/165, 180/65.1, 65.51, 65.6; 310/254
See application file for complete search history.

(56) References Cited

U.S. PATENT DOCUMENTS

| | | | |
|---|---|---|---|
| 468,526 A * | 2/1892 | Phillips | 105/52 |
| 1,669,951 A * | 5/1928 | Stitt | 416/60 |
| 3,799,284 A * | 3/1974 | Hender | 180/65.25 |
| 3,923,115 A * | 12/1975 | Helling | 180/65.25 |
| 3,983,738 A * | 10/1976 | Vlasov et al. | 72/429 |
| 4,233,858 A * | 11/1980 | Rowlett | 475/5 |
| 4,272,094 A * | 6/1981 | Patrin | 280/217 |
| 4,393,964 A * | 7/1983 | Kemper | 477/6 |
| 4,423,794 A * | 1/1984 | Beck | 180/165 |
| 4,533,011 A * | 8/1985 | Heidemeyer et al. | 180/65.25 |
| 4,591,016 A * | 5/1986 | Matthews | 180/165 |
| 4,626,696 A * | 12/1986 | Maucher et al. | 290/38 R |
| 4,629,947 A * | 12/1986 | Hammerslag et al. | 318/161 |
| 4,745,995 A * | 5/1988 | Wupper | 188/181 A |
| 5,052,987 A * | 10/1991 | Hagin et al. | 475/82 |
| 5,053,632 A * | 10/1991 | Suzuki et al. | 290/45 |
| 5,067,932 A * | 11/1991 | Edwards | 475/5 |
| 5,172,006 A * | 12/1992 | Suzuki et al. | 290/45 |
| 5,515,937 A * | 5/1996 | Adler et al. | 180/65.245 |
| 5,575,730 A * | 11/1996 | Edwards et al. | 475/5 |
| 5,767,595 A | 6/1998 | Rosen | |
| 5,893,895 A * | 4/1999 | Ibaraki | 701/57 |
| 6,019,319 A * | 2/2000 | Falbel | 244/165 |
| 6,040,634 A * | 3/2000 | Larguier | 290/45 |
| 6,098,735 A * | 8/2000 | Sadarangani et al. | 180/65.24 |
| 6,149,544 A * | 11/2000 | Masberg et al. | 477/13 |
| 6,286,635 B1 * | 9/2001 | Tamor | 188/72.3 |
| 6,487,998 B1 * | 12/2002 | Masberg et al. | 123/192.1 |
| 6,573,626 B1 * | 6/2003 | Gosebruch et al. | 310/74 |
| 6,688,412 B2 * | 2/2004 | Kima et al. | 180/65.51 |
| 6,710,579 B2 * | 3/2004 | Ebel et al. | 322/4 |
| 6,819,012 B1 | 11/2004 | Gabrys | |
| 6,880,654 B2 * | 4/2005 | Plishner | 180/65.6 |

(Continued)

*Primary Examiner*—Paul N Dickson
*Assistant Examiner*—Jacob Meyer
(74) *Attorney, Agent, or Firm*—Egbert Law Offices PLLC

(57) ABSTRACT

A vehicle energy recovery system has an axle, a wheel affixed to the axle so as to rotate with a rotation of the axle, a flywheel assembly mounted in or adjacent to the wheel so as to be rotatable independently of the rotation of the axle, a stator positioned in proximity to the flywheel assembly, a brake disk affixed to the axle and extending radially outwardly therefrom, and an energy transfer system cooperative with the brake disk for transferring energy from the brake disk to the flywheel assembly. A pair of calipers are respectively mounted adjacent opposite sides of the brake disk. The energy transfer system can be an induction stator or rotor positioned adjacent to the brake disk.

12 Claims, 3 Drawing Sheets

U.S. PATENT DOCUMENTS

| | | | |
|---|---|---|---|
| 6,897,576 B2 * | 5/2005 | Ishikawa et al. | 290/45 |
| 6,962,223 B2 * | 11/2005 | Berbari | 180/165 |
| 7,108,095 B1 * | 9/2006 | Washington et al. | 180/165 |
| 7,293,621 B2 * | 11/2007 | Long | 180/165 |
| 7,416,039 B1 * | 8/2008 | Anderson et al. | 180/165 |
| 7,478,693 B1 * | 1/2009 | Curtis | 180/165 |
| 7,520,353 B2 * | 4/2009 | Severinsky et al. | 180/65.8 |
| 7,540,346 B2 * | 6/2009 | Hu | 180/165 |
| 7,552,787 B1 * | 6/2009 | Williams | 180/65.51 |
| 7,559,388 B2 * | 7/2009 | Severinsky et al. | 180/65.28 |
| 2002/0125861 A1 * | 9/2002 | Ebel et al. | 322/4 |
| 2009/0177345 A1 * | 7/2009 | Severinsky et al. | 701/22 |

* cited by examiner

ENERGY RECOVERABLE WHEEL MOTOR

RELATED U.S. APPLICATIONS

The present application claims priority from U.S. Provisional Application Ser. No. 60/701,155, filed on Jul. 22, 2005, and entitled "Energy Recoverable Wheel Motor".

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to systems for recovering the braking energy of a vehicle. Additionally, the present invention relates to flywheel systems which receive kinetic energy for storage and for transmitting such kinetic energy for use. Additionally, the present invention relates to flywheel energy systems in which the flywheel is incorporated into the wheel of the vehicle whereby the braking energy can be used for the acceleration of the vehicle and where acceleration energy can be used for the braking of the vehicle.

BACKGROUND OF THE INVENTION

While flywheels are well known in the art, there is very little application of flywheels to moving vehicles. Some flywheels have been used in automobile engines to smooth out the pulses of energy provided by the exploding gases in the cylinders and to provide energy for the compression stroke of the pistons. However, flywheels have not been used for the storage of kinetic energy within the automobile.

It would be highly desirable to utilize flywheel system to store kinetic energy in moving vehicles so that they can be loaded and energy drawn many times. For example, an automobile equipped with a kinetic energy storing flywheel could conserve a significant portion of that energy which is lost upon stopping the vehicle. Similarly, the energy wasted in stopping an automobile can also be conserved and applied in accelerating the automobile or supplying the automobile with electrical power. Such a kinetic energy system could have vast application in the field of electric automobiles or other electrically-powered vehicles.

U.S. Pat. No. 6,819,012, issued on Nov. 16, 2004 to C. W. Gabrys, describes a flywheel energy storage system which has an energy storage flywheel supported in a low pressure containment vessel for rotation on a bearing system. A brushless motor/generator is coupled to the flywheel for accelerating and decelerating the flywheel for storing and retrieving energy. The flywheel is rotated in normal operation at a speed such that the generator voltage is higher than the output voltage. The flywheel's power supply efficiently maintains power to an electrical load during an interruption of primary power by supplying power generated from the flywheel's generator.

U.S. Pat. No. 5,767,595, issued on Jun. 16, 1998 to H. A. Rosen, provides a flywheel support system that isolates the flywheel and its motor-generator from the driving environment of an electrically-powered motor vehicle. During normal operation, a mechanical gimbal system keeps the vacuum housing centered in the outer housing, reacts the spin moments generated by the motor-generator, and provides a path for the electrical leads into the vacuum housing. A suitable liquid is placed between the outer and vacuum housings of the flywheel assembly to provide buoyancy and damping to the vacuum housing, cooling the motor-generator, and serving as one of the barriers to rotor energy and angular momentum transfer in the event of an accident or failure.

It is an object of the present invention to provide an energy recoverable wheel motor whereby the energy from braking can be transferred to the wheel for acceleration and whereby acceleration energy can be transmitted to the braking system.

Another object of the present invention is provide an energy recoverable wheel motor which avoids the use of battery storage.

It is a further object of the present invention to provide an energy recoverable wheel motor which reduces the energy requirements of the moving vehicle.

These and other objects and advantages of the present invention will become apparent from a reading of the attached specification and appended claims.

BRIEF SUMMARY OF THE INVENTION

The present invention is a vehicle energy recovery system comprising an axle, a wheel affixed to the axle so as to rotate with a rotation of the axle, a flywheel mounted in or adjacent to the wheel so as to be rotatable independent of the rotation of the axle, a stator positioned in proximity to the flywheel, a brake disk affixed to the axle extending radially outwardly therefrom, a pair of calipers cooperative with the brake disk so as to apply braking pressure to a surface of the brake disk, and an energy transfer means cooperative with the brake disk and calipers for transferring braking energy to the flywheel.

In the present invention, the flywheel has an outer banding extending around a periphery thereof. A bearing is interposed between the flywheel and the axle so as to allow the flywheel to rotate independently of the axle. The flywheel includes a conductive outer ring with a plurality of radially-spaced bars radiating toward the conductive outer ring from a central annular mounting. The bars are of a copper material. The plurality of radially spaced bars are sandwiched between ferromagnetic steel members.

In the present invention, the energy transfer means includes an induction stator or rotor positioned adjacent to the brake disk. In one embodiment of the present invention, the calipers can be affixed to the induction rotor. The induction rotor can include a conductive outer ring with a plurality of radially-spaced bars radiating toward the conductive outer ring from a central-mounting. The plurality of radially-spaced bars are sandwiched between ferromagnetic steel members. A transducer can be interconnected between the calibers and the induction rotor. A control means serves to transfer energy from the flywheel to the inductor stator or rotor when the transducer means senses a braking of the vehicle.

A pair of permanent magnets can be placed on opposite sides of the brake disk so as to transfer energy to the brake disk. The conductive stator or rotor can include a stationary induction "squirrel cage" induction rotor. Similarly, the flywheel can also be an induction "squirrel cage" rotor.

DETAILED DESCRIPTION OF THE INVENTION

Figure 1:
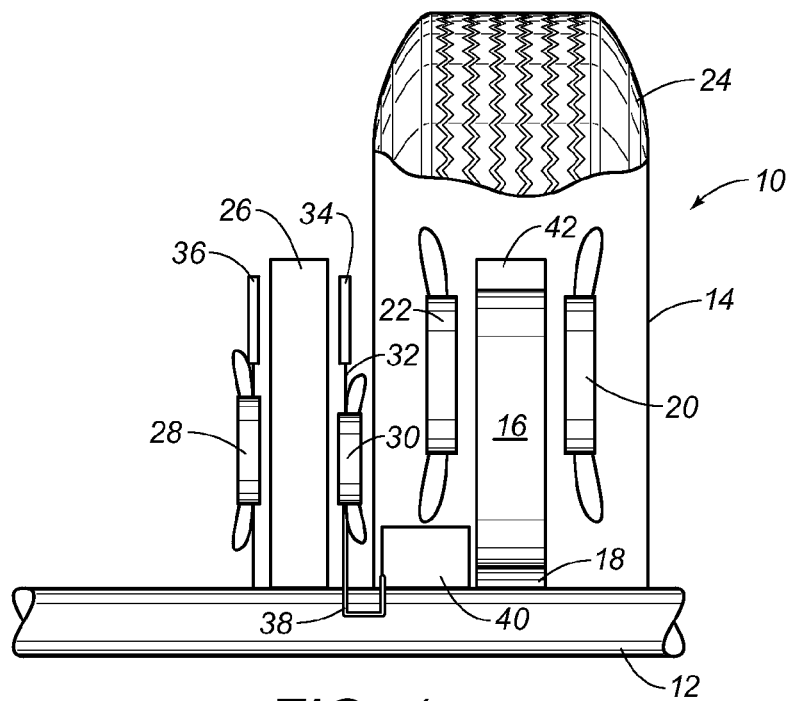
FIG. 1 is an illustration of the preferred embodiment of the present invention.

Referring to FIG. 1, there is shown the vehicle energy recovery system 10 in accordance with a simple embodiment of the present invention. The vehicle recovery system 10 includes an axle 12 having a wheel 14 affixed thereto. The wheel 14 will rotate with the rotation of the axle 12. A flywheel 16 is mounted in or adjacent to the wheel 14. The flywheel 16 is rotatable independent of the rotation of the axle 12. A secondary bearing 18 is interposed between the axle 12 and the flywheel 16 so as to allow the flywheel 16 to rotate independently of the axle 12. Induction rotor stators 20 and 22 are mounted on opposite sides of the flywheel 16. The stators 20 and 22 will rotate with the rotation of the wheel 14. The stators 20 and 22 are located in proximity to and on opposite sides of the flywheel 16 so as to be properly energized in a generator motor during the acceleration of the vehicle and during the rotational acceleration of the wheel 14 and its associated tire 24.

A brake disk 26 is mounted onto the axle 12 and extends radially outwardly therefrom. The brake disk 26 is in the nature of a conventional aluminum brake disk that can be used on an existing vehicle. Induction motor stators 28 and 30 are located on opposite sides of the brake disk 26. These induction motors stators 28 and 30 will be energized in a generator motor during braking. A transducer 32 connects calipers 34 and 36 to the stators 28 and 30 so as to signal when the vehicle is braking. The calipers 34 and 36 can be conventional calipers as used with the vehicle whereby the force applied by the calipers 34 and 36 will exert a braking force on the brake disk 26 so as to slow the vehicle, as desired. An energy transfer line 38 extends from the induction motor stators 28 and 30 to an electronics package 40 mounted in the wheel 14. As such, energy transfer can occur as realized from the inductor motor stators 20 and 22 and by the induction motor stators 28 and 30.

The flywheel 16 can take on a wide variety of configurations. In the preferred embodiment of the present invention, the flywheel 16 is an aluminum rotor that is mounted on the secondary bearing 18. A banded carbon composite banding 42 will wrap around the periphery of the flywheel 16 so as to provide containment and strength. The flywheel 16 is mounted so as to speed up during the braking action and slow down during acceleration from a stop.

The system of the present invention effectively avoids the use of batteries as a storage medium. The use of batteries has drawbacks. First, the energy storage density of batteries is much lower than the use of a flywheel 16. Secondly, the life cycle of a battery is incredibly small as compared to the flywheel. Thirdly, the acceleration torque is significant and will constitute significant internal heating within the battery. The electrical power realized in the system of the present invention is only excitation power. This can be actually realized passively through the use of capacitors within control electronics 40.

Figure 2A:
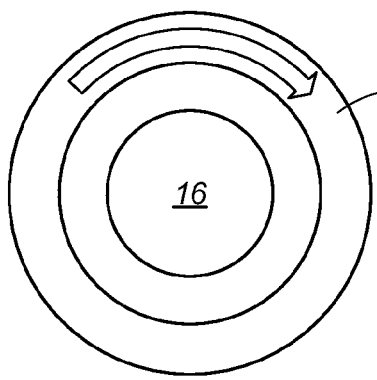
FIGS. 2A-D shows the various operating regimes for the braking, acceleration and desired flywheel rotation at slow speed as used in the present invention.
Figure 2B:
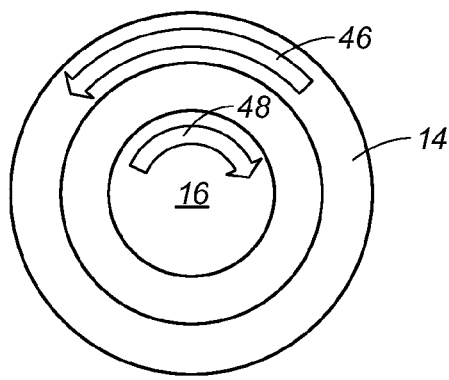
Figure 2C:
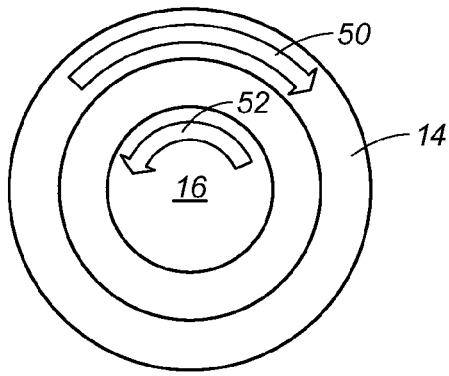
Figure 2D:
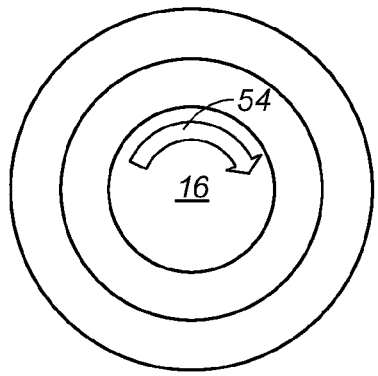

FIGS. 2A-D show the various operating regimes for braking, acceleration and desired flywheel rotation at slow speeds. In FIG. 2A it can be seen that the wheel 14 is rolling in the direction toward the right, as illustrated by arrow 44. As a result, the flywheel 16 will be rotating in a clockwise direction. FIG. 2B shows the action of the wheel 14 during braking. During the braking, the torque on the wheel will be counter-clockwise, as illustrated by arrow 46. The torque on the flywheel will be clockwise as illustrated by 48. The flywheel 16 will speed up in the rolling direction during the application of braking energy. FIG. 2C illustrates the operation of the flywheel 16 during the acceleration of the wheel 14. As can be seen, during acceleration, the wheel 14 will be rotating clockwise in the direction of arrow 50. The torque on the flywheel will be counter-clockwise in the direction of arrow 52. As a result, the flywheel will slow down. FIG. 2D illustrates arrow 54 indicating that the flywheel 16 is desirably always rotating in a clockwise direction.

When the vehicle is traveling toward the left (a clockwise rotation for the wheel 14), a counter-clockwise torque is required to stop the vehicle. This accomplished by applying a clockwise torque to the braking disk through the induction stators 28 and 30. Only excitation power is required in this operation. This energy is immediately fed through a converter in the electronics package 40 in order to speed up the rotation of the flywheel 16 on the rotating wheel 14. During acceleration, the flywheel 16 goes into a generator mode. A counter-clockwise torque is applied to it through the induction stators 20 and 22. This excitation power can be realized passively through capacitors. In the present invention, a power draw from the vehicle battery or generator is never required even to generate significant torque since it is always supplied by the flywheel energy. All of the drive power remains on the spinning axle 12.

Figure 3:
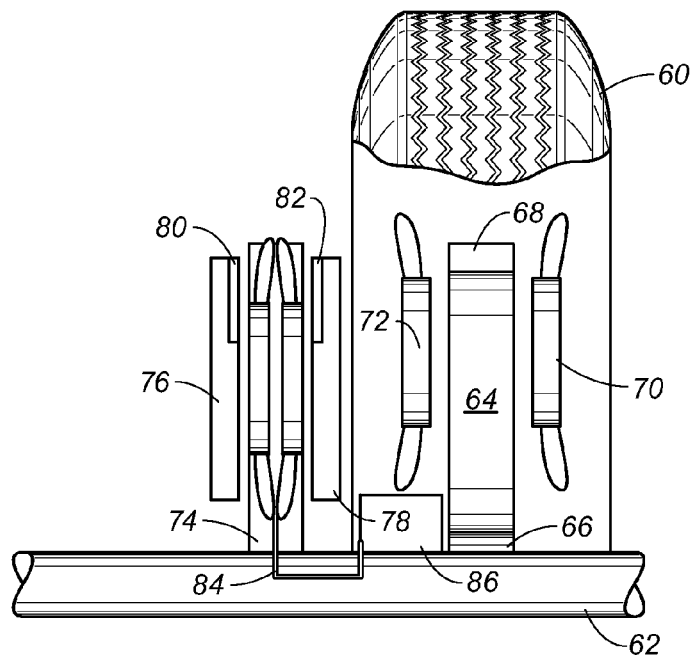
FIG. 3 shows an alternative embodiment of the present invention in which induction rotors are utilized for braking and generating from the flywheel.

FIG. 3 shows an alternative embodiment of the present invention wherein induction rotors are used for both braking and energy generation from the flywheel. In FIG. 3, the wheel 60 is mounted on axle 62 in the manner of FIG. 1. The flywheel 64 is mounted on secondary bearing 66 over the axle 62. A carbon composite banding 68 is applied around the outer periphery of the flywheel 64. The first high speed flywheel induction "squirrel cage" secondary is formed by the flywheel 64. The stators 70 and 72 are mounted within the wheel 60 so as to rotate with the wheel.

In FIG. 3, it can be seen that the brake disk 74 extends radially outwardly of the axle 62. Stationary induction "squirrel cage" secondaries 76 and 78 are mounted on opposite sides of the brake disk 64. Importantly, the calipers 80 and 82 are mounted on the periphery of the stationary induction "squirrel cage" secondaries 76 and 78. As such, when the calipers 80 and 82 act on the surface of the brake disk 74, the induction "squirrel cage" secondaries 76 and 78 will be in proximity to the electronics package within the brake disk 64. Energy can be transferred along line 84 from the electronics package within the brake disk 64 to the controller. These induction motor/generators have the advantage of being of lower cost and more robust in the reliability-sensitive automotive field. In FIG. 3, it can be seen how the two induction rotors can be employed for this task. The higher speed induction flywheel rotor 64 is the typical axial flux induction system.

Figure 4:
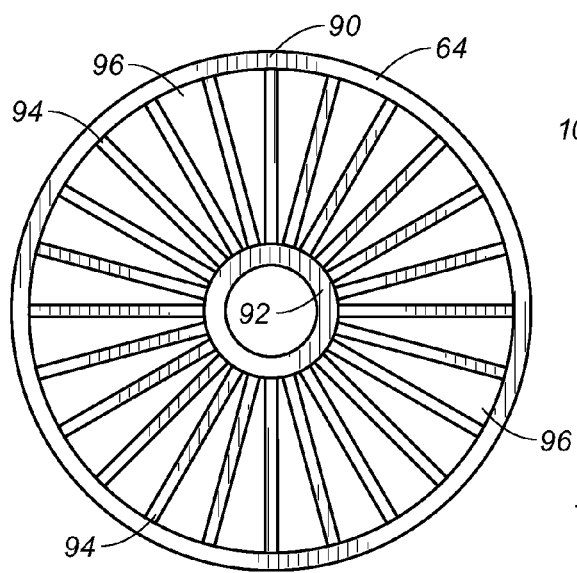
FIG. 4 is a side elevational view of the full axial flux induction rotor.

FIG. 4 particularly illustrates the induction rotor 64. As can be seen, there is a conductive outer ring 90 which extends therearound. An annular central mounting ring 92 can be used in association with the secondary bearing 66. A plurality of radially-spaced bars 94 radiate outwardly in spaced relationship from each other from of the central mounting ring 92 toward the conductive outer ring 90. The conductive bars 94 can be formed a copper material sandwiched between tape-wound ferromagnetic steel members 96 extending therebetween. The ferromagnetic steel members can be of M19 steel. The M19 steel can be suitably laminated so as to provide strength and structural integrity to the conductive rotor 64.

Figure 5:
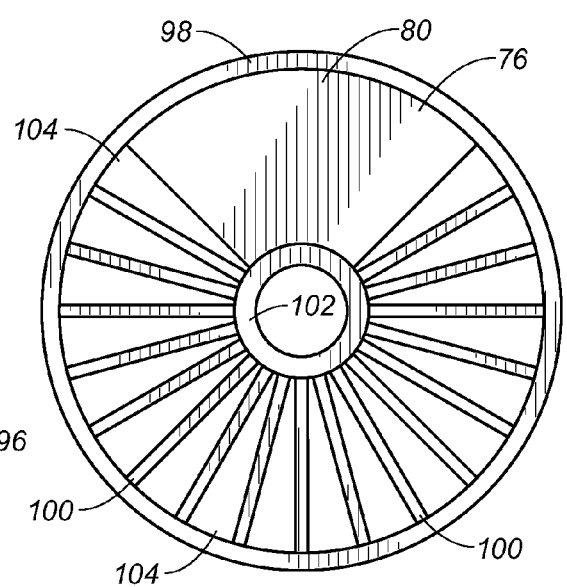
FIG. 5 is a side elevation view of a partial induction rotor with brake calipers.

FIG. 5 illustrates the induction rotor 76 as used with the brake caliper 80. Once again, this induction rotor 76 includes a conductive outer ring 98 having a plurality of radially extending conductive bars 100 extending from central annular mounting 102 to the conductive outer ring 98. Once again, the copper conductive bars 100 are sandwiched between tape-wound ferromagnetic steel members 104 so as to provide proper strength and structure integrity to the induction rotor 76. The brake caliper 80 can be positioned across a radius of the induction rotor 76 so as to provide a contact surface for the slowing or the braking of the brake disk 74.

Figure 6:
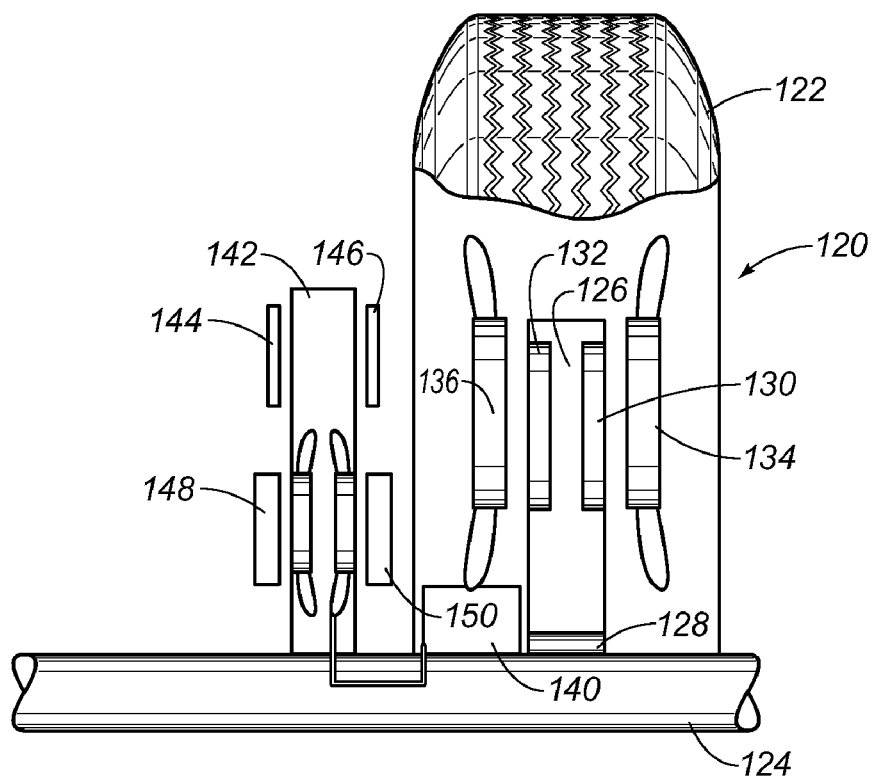
FIG. 6 is an alternative embodiment of the present invention whereby a means is shown for bypassing power transfer across the axle.

FIG. 6 shows an alternative embodiment system 120. System 120 includes a wheel 122 mounted on axle 124. A flywheel 126 is mounted on a secondary bearing 128 so as to rotate independently of the axle 124. Permanent magnets 130 and 132 can be mounted within the flywheel 126 on opposite sides thereof. Stators 134 and 136 are provided so as to rotate with the wheel 122 relative to the flywheel 126. The electronics package 140 is positioned within the wheel 122 adjacent to the axle 124.

The brake disk 142 radiates outwardly from the axle 124. Calipers 144 and 146 are positioned adjacent opposite surfaces of the brake disk 142 and can be suitably activated so as to provide the necessary slowing or braking of the brake disk 142, along with the associated axle 124. Permanent magnets 148 and 150 are positioned on opposite sides of the brake disk 142. The system 120 provides a means for bypassing the power transfer across the axle 124. This is accomplished when the excitation is reversed on the brake disk 124, as shown in FIG. 3. Although permanent magnets are illustrated in FIG. 6, it can be changed to conductors for an induction generator operation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A vehicle energy recovery system comprising:
   an axle;
   a wheel affixed to said axle so as to rotate with a rotation of said axle;
   a flywheel assembly mounted in or adjacent to said wheel so as to be rotatable independently of the rotation of said axle, said flywheel assembly being mounted interior of said wheel;
   a stator positioned in proximity to said flywheel assembly, said stator positioned within said wheel so as to rotate with the rotation of said wheel;
   a brake disk affixed to said axle and extending radially outwardly therefrom; and
   an energy transfer means cooperative with said brake disk for transferring energy from said brake disk to said flywheel assembly.

2. The system of claim 1, said flywheel assembly comprising:
   a flywheel; and
   a bearing interposed between said flywheel and said axle.

3. The system of claim 2, said flywheel comprising:
   a central annular mounting;
   a conductive outer ring; and
   a plurality of radially spaced bars extending from said conductive outer ring to said central annular mounting.

4. The system of claim 3, said flywheel further comprising:
   a plurality of ferromagnetic steel members sandwiched respectively between adjacent pairs of said plurality of radially spaced bars.

5. The system of claim 2, said flywheel assembly having an outer banding extending around an outer periphery thereof.

6. The system of claim 1, further comprising:
   a pair of calipers respectively mounted adjacent opposite sides of said brake disk so as to selectively apply a braking force to said brake disk.

7. The system of claim 6, said energy transfer means being cooperative with said pair of calipers for transferring braking energy as applied by said pair of calipers to said flywheel assembly.

8. The system of claim 6, said energy transfer means comprising:
   an induction stator or rotor positioned adjacent to said brake disk and affixed to said calipers.

9. A vehicle energy recovery system comprising:
   an axle;
   a wheel affixed to said axle so as to rotate with a rotation of said axle;
   a flywheel assembly mounted in or adjacent to said wheel so as to be rotatable independently of the rotation of said axle;
   a stator positioned in proximity to said flywheel assembly;
   a brake disk affixed to said axle and extending radially outwardly therefrom;
   an energy transfer means cooperative with said brake disk for transferring energy from said brake disk to said flywheel assembly; and
   a pair of calipers respectively mounted adjacent opposite sides of said brake disk so as to selectively apply a braking force to said brake disk, said energy transfer means comprising an induction rotor, said induction rotor comprising:
      a disk having a conductive outer ring and a central mounting, said central mounting affixed to said axle, said disk having a plurality of radially spaced bars extending from said central mounting to said outer ring, said disk having a plurality of ferromagnetic steel members fixed to and respectively between adjacent pairs of said plurality of radially spaced bars.

10. The system of claim 9, further comprising:
    a transducer means for sensing a braking as applied to said brake disk; and
    a control means for transferring energy from said flywheel assembly to said induction rotor when said transducer means senses the braking.

11. The system of claim 10, said transducer means being cooperative with said pair of calipers and said induction rotor.

12. The system of claim 9, said induction rotor comprising a squirrel cage induction rotor.

* * * * *